US010551581B2

(12) United States Patent
Khazen et al.

(10) Patent No.: US 10,551,581 B2
(45) Date of Patent: Feb. 4, 2020

(54) OPTICAL CONNECTOR CAGE WITH ENHANCED THERMAL PERFORMANCE

(71) Applicant: Mellanox Technologies, Ltd., Yokneam (IL)

(72) Inventors: Nimer Khazen, Yokneam (IL); Tom David, Yokneam (IL); Yaniv Katzav, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/954,745

(22) Filed: Apr. 17, 2018

(65) Prior Publication Data

US 2018/0306989 A1    Oct. 25, 2018

Related U.S. Application Data

(60) Provisional application No. 62/487,850, filed on Apr. 20, 2017.

(51) Int. Cl.
*G02B 6/36*  (2006.01)
*G02B 6/42*  (2006.01)

(52) U.S. Cl.
CPC ................ *G02B 6/4269* (2013.01)

(58) Field of Classification Search
CPC .. G02B 6/4269; G02B 6/4201; G02B 6/3807; H01L 31/024; H04B 1/036; H05K 7/20154; H05K 2201/066; F21V 29/70
See application file for complete search history.

(56) References Cited

U.S. PATENT DOCUMENTS

| | | |
|---|---|---|
| 6,866,544 B1 | 3/2005 | Casey et al. |
| 7,457,126 B2 | 11/2008 | Ahrens |
| 8,223,498 B2 | 7/2012 | Lima |
| 8,670,236 B2 | 3/2014 | Szczesny et al. |
| 8,823,540 B2 * | 9/2014 | Scholeno ............. H01R 12/716 340/815.4 |
| 9,246,280 B2 * | 1/2016 | Neer ..................... G02B 6/4246 |
| 9,391,407 B1 * | 7/2016 | Bucher ................ H01R 13/659 |
| 9,681,583 B2 * | 6/2017 | Lei ....................... H01L 23/4093 |
| 9,787,034 B2 * | 10/2017 | Yang ..................... G02B 6/3817 |
| 9,893,474 B1 | 2/2018 | Jandt et al. |
| 9,924,615 B2 | 3/2018 | Bucher |
| 2003/0159772 A1 | 8/2003 | Wolf et al. |

(Continued)

*Primary Examiner* — Ellen E Kim
(74) *Attorney, Agent, or Firm* — Alston & Bird LLP

(57) ABSTRACT

Apparatuses and associated methods of manufacturing are described that provide an optical connector cage configured to receive an optical cable connector. The optical connector cage includes a body defined by a top portion, a bottom portion, two side portions, a first end, and a second end. The body defines a receiving space that can at least partially receive an optical cable connector therein and one or more openings. The optical connector cage defines one or more heat dissipation units disposed within the one or more openings, and each heat dissipation unit further includes a first set of heat dissipation elements having a first height, and a second set of heat dissipation elements having a second height. The second height is different than the first height such that the one or more heat dissipation elements allow heat to be transferred from the body to an external environment.

18 Claims, 9 Drawing Sheets

(56) References Cited

U.S. PATENT DOCUMENTS

| | | | |
|---|---|---|---|
| 2003/0161108 A1* | 8/2003 | Bright | G02B 6/4201 361/707 |
| 2004/0027816 A1 | 2/2004 | Ice | |
| 2005/0195565 A1* | 9/2005 | Bright | H04B 1/036 361/688 |
| 2010/0309626 A1* | 12/2010 | Xu | G06F 1/181 361/679.54 |
| 2015/0029667 A1 | 1/2015 | Szczesny | |
| 2015/0280368 A1* | 10/2015 | Bucher | H01R 13/665 439/487 |
| 2015/0342090 A1 | 11/2015 | Yang et al. | |
| 2016/0093996 A1 | 3/2016 | Phillips | |
| 2016/0238805 A1 | 8/2016 | McColloch | |

* cited by examiner

OPTICAL CONNECTOR CAGE WITH ENHANCED THERMAL PERFORMANCE

CROSS-REFERENCE TO RELATED APPLICATIONS

This application claims priority to U.S. Provisional Application Ser. No. 62/487,850, filed Apr. 20, 2017, which application is incorporated by reference herein in its entirety.

BACKGROUND

The present disclosure relates in general to optical cable connectors used in conjunction with datacenter switch systems, modules, and other optical components. In particular, optical connector cages, shells, and housings utilizing heat dissipation units and elements are described that are configured to increase the thermal performance of datacenter connections.

Datacenter switch systems and associated modules may generally include connections between other switch systems, servers, racks, and devices. Such connections may be made using cables, transceivers, and connectors, which may include a shell or housing configured to protect these optical connections from damage. Often, these connectors can generate heat during operation, which can result in failures of system components. The inventors have identified numerous other deficiencies with existing technologies in the field, the remedies for which are the subject of the embodiments described herein.

BRIEF SUMMARY

Accordingly, the apparatuses and methods of manufacturing described herein provide an optical connector cage with enhanced thermal performance. In some embodiments, an optical connector cage configured to receive an optical cable connector may include a body defined by a top portion, a bottom portion, two side portions, a first end, and a second end. The body may define a receiving space configured to at least partially receive an optical cable connector therein. The body may receive the optical cable connector via the first end, wherein the second end may be configured to be received by a datacenter rack for enabling signals to pass between the optical cable connector and the datacenter rack. The top portion may define one or more openings and one or more heat dissipation units disposed within the one or more openings. Each heat dissipation unit may further include a first set of heat dissipation elements having a first height, and a second set of heat dissipation elements having a second height. The second height may be different than the first height such that the one or more heat dissipation elements are configured to allow heat to be transferred from the body to an external environment of the optical connector cage.

In some embodiments, the one or more heat dissipation elements may include fins. In such an embodiment, the fins may be disposed substantially perpendicular with respect to the top portion.

In some cases, the one or more openings may be spaced along a length of the top portion.

In other cases, in an operational configuration in which the optical cable connector is received within the optical connector cage, the optical connector cage may further be configured such that the one or more heat dissipation elements may contact the optical cable connector.

In other embodiments, the one or more heat dissipation units may further include a heat dissipation base integral to the one or more heat dissipation units and may be configured to contact the optical cable connector.

In some cases, the optical connector cage may further include spring-assisted contact flanges, configured to urge the one or more heat dissipation units into contact with a top surface of the optical cable connector.

In some embodiments, the second height of the second set of heat dissipation elements may be greater than the first height of the first set of heat dissipation elements such that a portion of the second set may extend through a plane defined by a bottom surface of the first set of heat dissipation elements.

In some further embodiments, the top portion of the body may further include a stopper configured to accommodate an extended length of the first set or the second set of one or more heat dissipation elements.

In any embodiment, the optical cable connector may be a quad small form-factor pluggable cable connector.

In other embodiments, a method of manufacturing an optical connector cage configured to receive an optical cable connector is provided. The method may include forming a body defined by a top portion, a bottom portion, two side portions, a first end, and a second end, wherein forming the body may include defining a receiving space configured to at least partially receive an optical cable connector therein via the first end. The second end may be configured to be received by a datacenter rack for enabling signals to pass between the optical cable connector and the datacenter rack, and the top portion may define one or more openings. The method may include forming one or more heat dissipation units disposed within the one or more openings, wherein forming each heat dissipation unit may further include forming a first set of heat dissipation elements having a first height, and a second set of heat dissipation elements having a second height. The second height may be different than the first height such that the one or more heat dissipation elements are configured to allow heat to be transferred from the body to an external environment of the optical connector cage.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
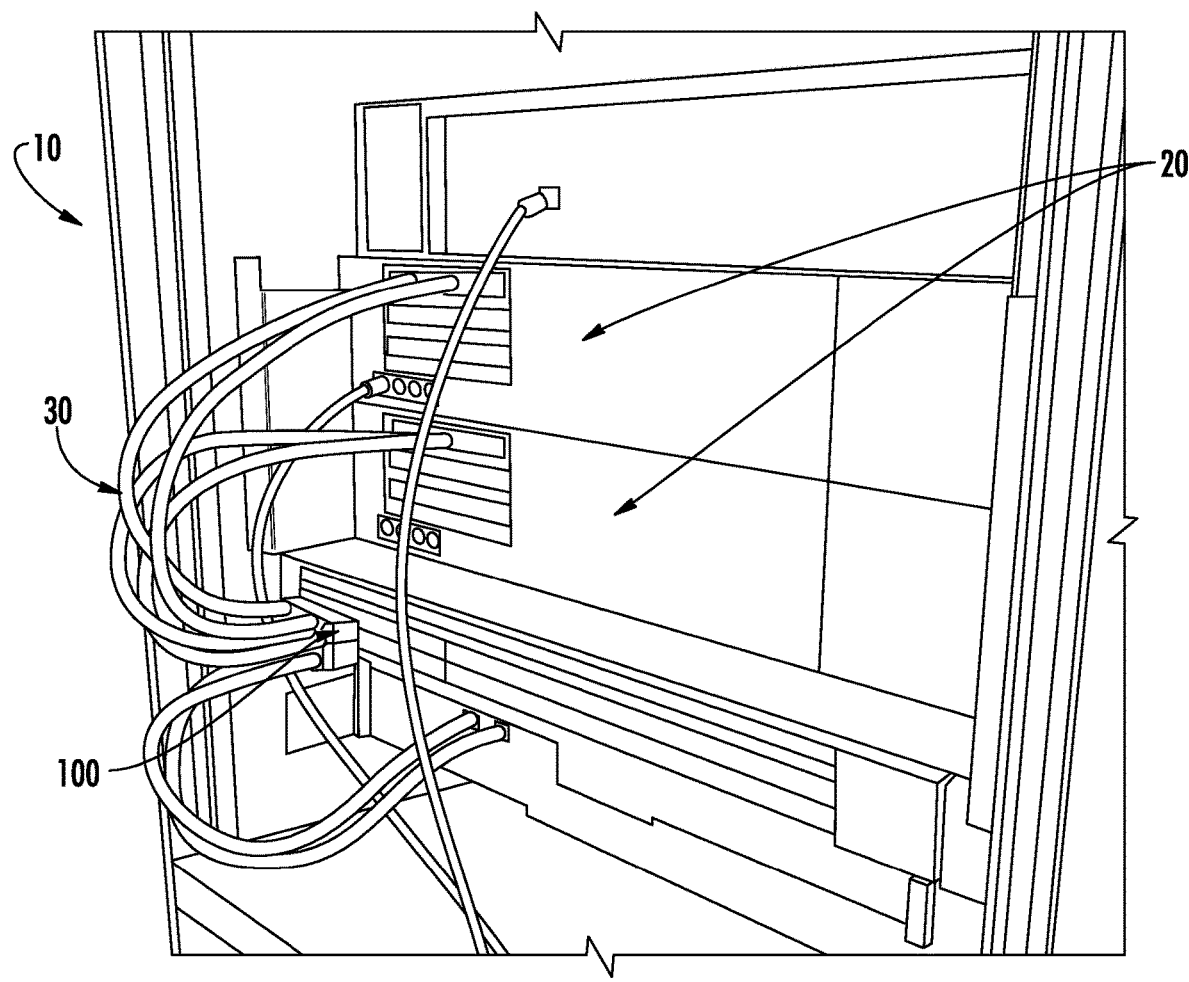
FIG. 1 is a front perspective view of a rack of switch modules in a datacenter for use in accordance with some embodiments discussed herein.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. As used herein, the term "module" encompasses hardware, software and/or firmware configured to perform one or more particular functions, including but not limited to conversion between electrical and optical signals and transmission of the same. As would be evident to one of ordinary skill in the art in light of the present disclosure, the term "substantially" indicates that the referenced element or associated description is accurate to within applicable engineering tolerances. As discussed herein, the example embodiment may be described with reference to a quad small form-factor pluggable (QSFP) connector as the optical cable connector; however, the embodiments of the present invention may be equally applicable for use with any cable (e.g., passive copper cable (PCC), active copper cable (ACC), or the like) or interconnect utilized by datacenter racks and associated switch modules (e.g., an active optical module (AOM), QSFP transceiver module, or the like). Additionally, as discussed herein, the example embodiment may be described with reference to a vertical-cavity surface-emitting laser (VCSEL) as an element of a transceiver system; however, embodiments of the present invention may be equally applicable for use with any transceiver system and/or element.

Extensive growth in global internet traffic due to increasing demands for high-definition video and high-speed broadband penetration has required new hardware that allows for higher data transmission rates in datacenters. These developments have resulted in the use of optical fibers offering enhanced capacity (e.g., greater bandwidth) over distance, increased bandwidth density, greater security and flexibility, and lower costs as compared to conventionally-used copper cables. A conventional datacenter rack 10, or cabinet that is designed to house servers, networking devices, modules, and other datacenter computing equipment and used in conjunction with optical fibers, is depicted in FIG. 1.

Accordingly, various different types of optical cable connectors also exist for enabling transmission of signals (optical and/or electrical) between switch modules and other equipment in a datacenter. For example, Quad Small Form-factor Pluggable (QSFP) connectors and cables, as well as other forms of connectors such as Small Form Pluggable (SFP) and C-Form-factor Pluggable (CFP) connectors, have long been the industry standard for providing high-speed information operations interface interconnects. More recently, Octal Small Form-factor Pluggable (OSFP) transceivers have come about to provide increased bit rate capabilities of up to 400 Gbps. Regardless of the type of optical cable connector, these transceivers may interface a switch system board, such as a motherboard in a switch system, to a fiber optic or copper networking cable, such as by making connections between switch modules 20 as shown in FIG.

With continued reference to FIG. 1, for example, a switch module 20, which may house an application-specific integrated circuit (ASIC) as well as other internal components (not visible), is typically incorporated into a datacenter network via connections to other switch systems, servers, racks, and network components. A switch module 20 may, for example, interact with other components of the datacenter via external optical cables 30 and possible transceiver systems housed in the end of an optical cable. These optical cables 30 and transceivers may allow connections between a switch module and the other components of the datacenter network via optical connector cages 100.

The switch modules 20 may be configured to be received by a datacenter rack 10 and may be configured to allow for the conversion between optical signals and electrical signals. For example, optical cables 30 may carry optical signals as inputs to the switch module 20. The optical signals may be converted to electrical signals via an opto-electronic transceiver, which may form part of the optical cable 30 in cases in which the optical cable 30 is an Active Optical Cable (AOC), such as a cable that includes a QSFP connector that is received by a port of a switch module 20. In other cases, the optical cable 30 may be passive, and the switch module 20 may include opto-electronic components that convert between optical signals and electrical signals. The electrical signals may then be processed by the switch module 20 and/or routed to other computing devices, such as servers and devices on other racks or at other datacenters via other components and cables (not shown). In addition, electrical signals received from other networking devices (e.g., from other datacenters, racks, etc.) may be processed by the switch module 20 and then converted into corresponding optical signals to be transmitted via the optical cables 30, going the opposite direction.

With continued reference to the datacenter rack 10 of FIG. 1, the transmission of data as electrical signals and the conversion between optical signals and electrical signals (e.g., via an AOC 30 and associated transceiver system or AOM) often results in the generation of heat by the components of the datacenter rack 10. As would be understood by one of ordinary skill in the art in light of the present disclosure, higher temperatures associated with such heat emissions can correspond to the increased likelihood of failure of electrical components and/or changes in the electrical and/or optical parameters of the components. Additionally, localization or concentration of higher temperatures in electrical components (e.g., the top surface of the AOC, AOM, or QSFP cable connector) can result in a further increase in the likelihood of failure of electrical components located near the area of concentration.

Accordingly, embodiments of the invention described herein provide an optical connector cage that is configured to provide increased thermal efficiency by utilizing nontraditional heat dissipation element configurations to more evenly distribute heat and/or to more effectively dissipate the heat to the surrounding environment to maintain lower temperatures in the components.

Figure 1A:
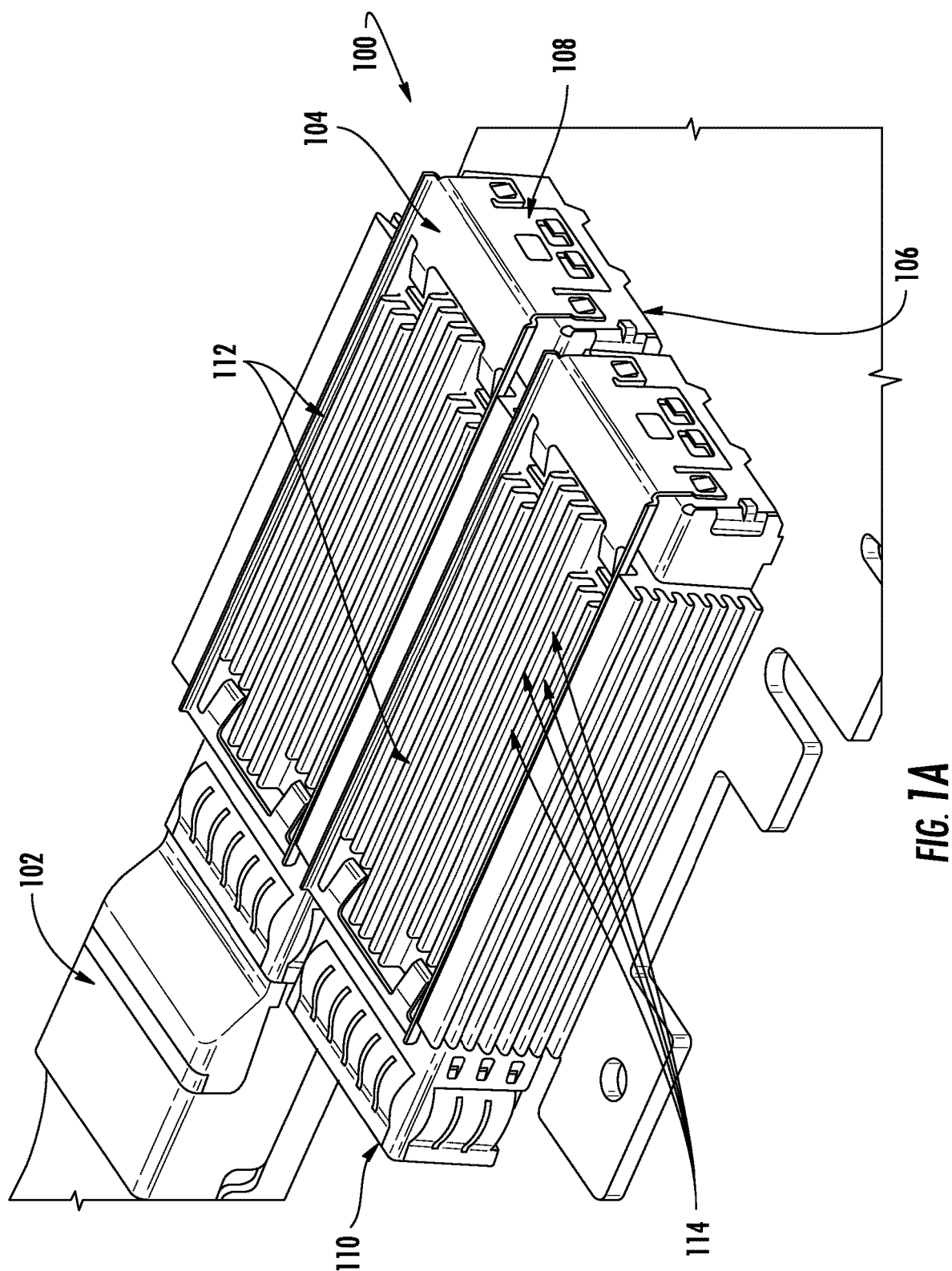
FIG. 1A is a perspective view of an optical cable connector and an optical connector cage in accordance with some embodiments discussed herein.
Figure 2:
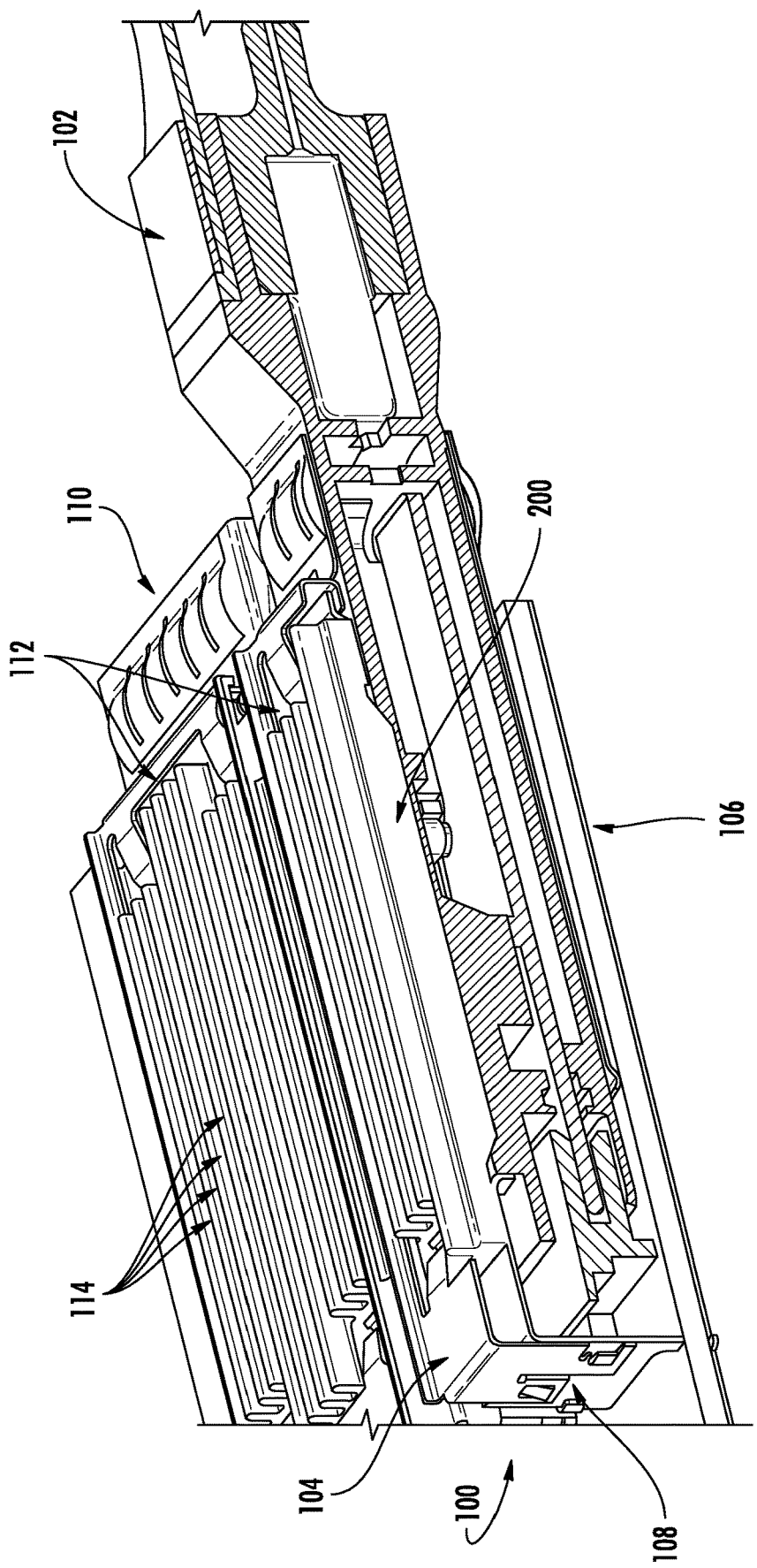
FIG. 2 is a perspective cross-section view of the devices of FIG. 1 according to an example embodiment.

With reference to FIGS. 1A-2, an optical connector cage 100 is illustrated. The body of the optical connector cage 100 may be defined by a top portion 104, a bottom portion 106, side portions extending between the top portion 104 and bottom portion 106, a first end 110, and a second end 108. As will be discussed hereinafter with reference to FIGS. 5-7, the top portion 104 of the optical connector cage 100 may further define one or more openings 500. The body of the optical connector cage 100 may be configured to at least partially receive an optical cable connector 102 (e.g., a QSFP cable and/or connector). By way of example, the body of the optical connector cage 100 may define a channel, through-hole, or other space (e.g., receiving space 600 in FIG. 6) configured to receive at least a portion of the optical cable connector 102, such that the body at least partially surrounds that portion.

Figure 3:
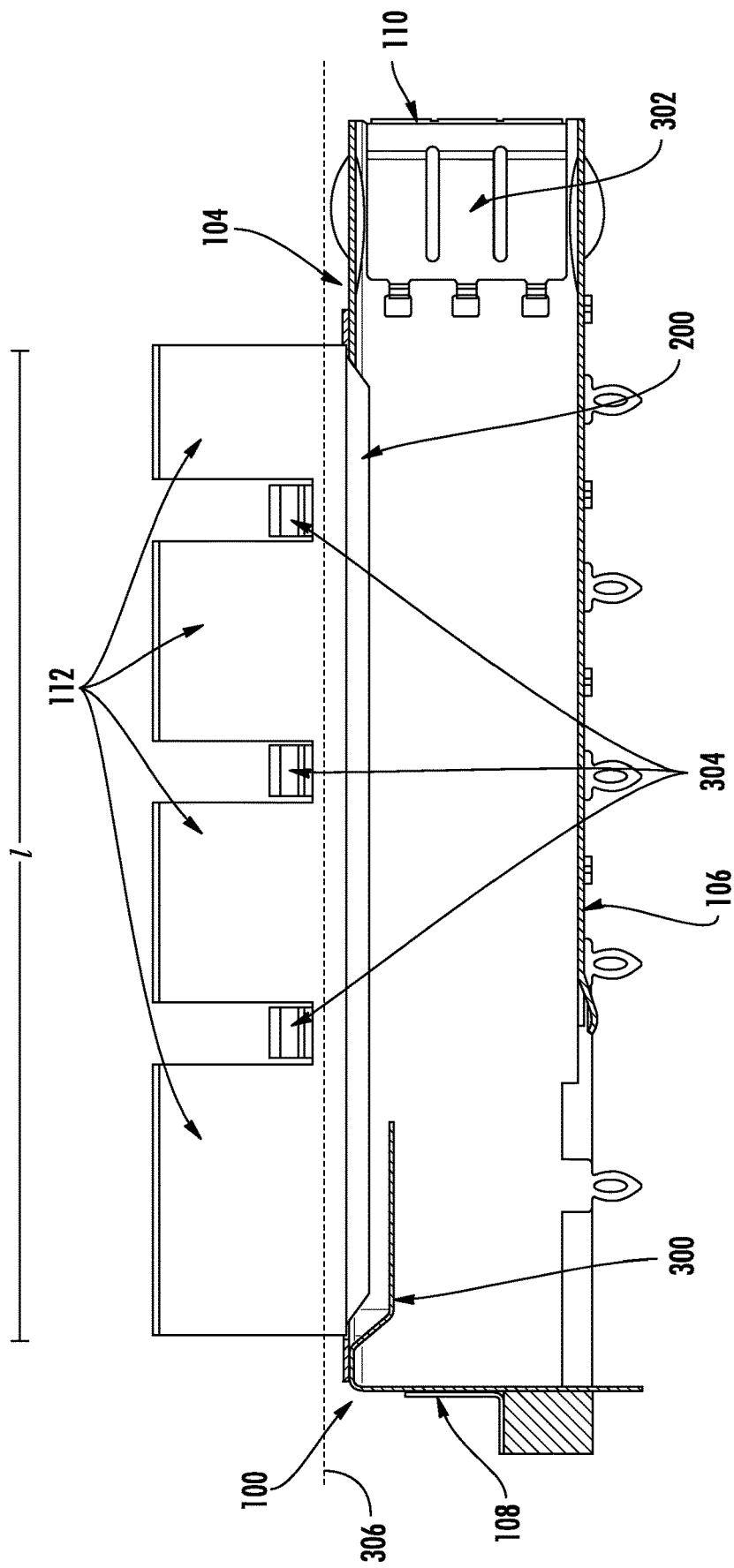
FIG. 3 is a side cross-section view of the optical connector cage of FIG. 1 according to an example embodiment.

The optical connector cage 100 may also define a first end 110, where the first end is in communication with the receiving space 600 and is configured to receive an optical cable connector 102 therein. As illustrated in FIG. 3, the first end 110 of the optical connector cage 100 may be defined such that at least a portion of the optical cable connector 102 may be inserted into the optical connector cage 100, or otherwise brought into engagement or contact with an inner surface of optical connector cage 100. The first end 110 may be configured to receive an optical cable connector 102 of any dimension or of any type (e.g., AOC, Ethernet, Direct Attach Copper, etc.). By way of example, the first end 110 may be configured to receive a cable connector corresponding to a QSFP cable connector, such that the QSFP is secured to the optical connector cage 100 by engaging at least a part of the inner surface optical connector cage 100.

The optical connector cage 100 may further define a second end 108, where the second end 108 is configured to be received by a switch module for enabling signals to pass between the optical cable connector 102 and the switch module. As can be seen in FIGS. 1-2, the optical connector cage 100 may be configured to engage, or be secured to, a switch module (e.g., switch module 20 in FIG. 1). The optical connector cage 100 may be configured such that the second end 108 defines at least one extension capable of being received by a datacenter switch module 20 (e.g., male to female connection). As discussed above, the opening (e.g., receiving space 600 in FIG. 6) defined by the body of the optical connector cage 100 may be such that an active end of an optical cable connector 102 may extend through the body of the optical connector cage 100. Specifically, the active end of the optical cable connector 102 may be configured (e.g., sized and shaped) such that upon engagement of the second end 108 of the optical connector cage 100 with the switch module, the active end of the optical cable connector 102 may also engage the switch module such that signals may be transmitted between the cable and switch module. By way of a more particular example, a QSFP may be received by the optical connector cage 100 such that at least a portion of the QSFP is supported and/or surrounded by the body of the optical connector cage 100. The active end of the QSFP (e.g., the end configured to engage a datacenter switch module and allow electrical communication therein) may be positioned such that when the optical connector cage 100 engages a datacenter switch module, the active end of the QSFP engages a corresponding port of the switch system to allow signals (e.g., electrical signals, optical signals, or the like) to travel between the QSFP and the switch module.

Figure 4:
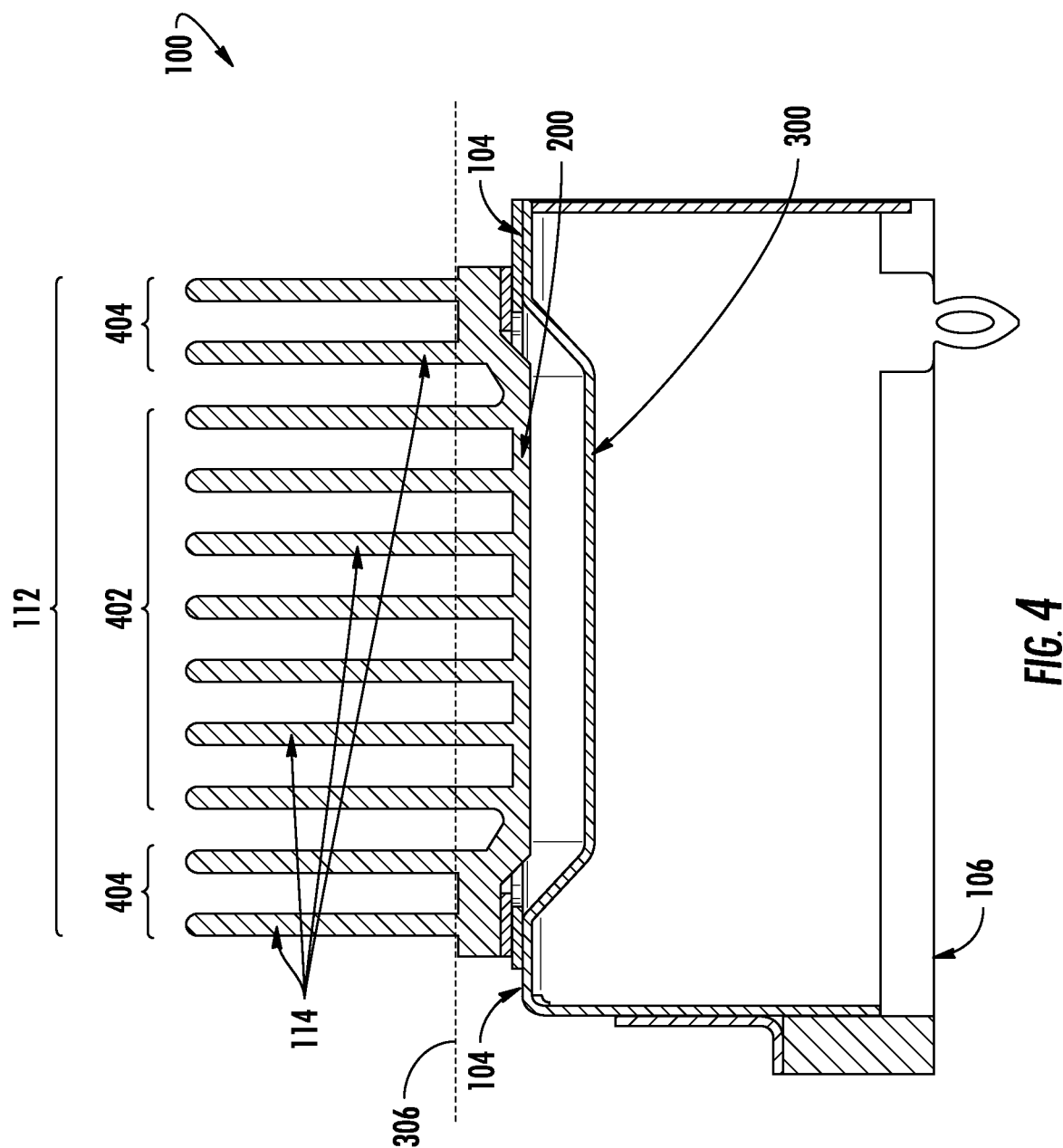
FIG. 4 is an end cross-section view of the optical connector cage of FIG. 1 according to an example embodiment.
Figure 8:
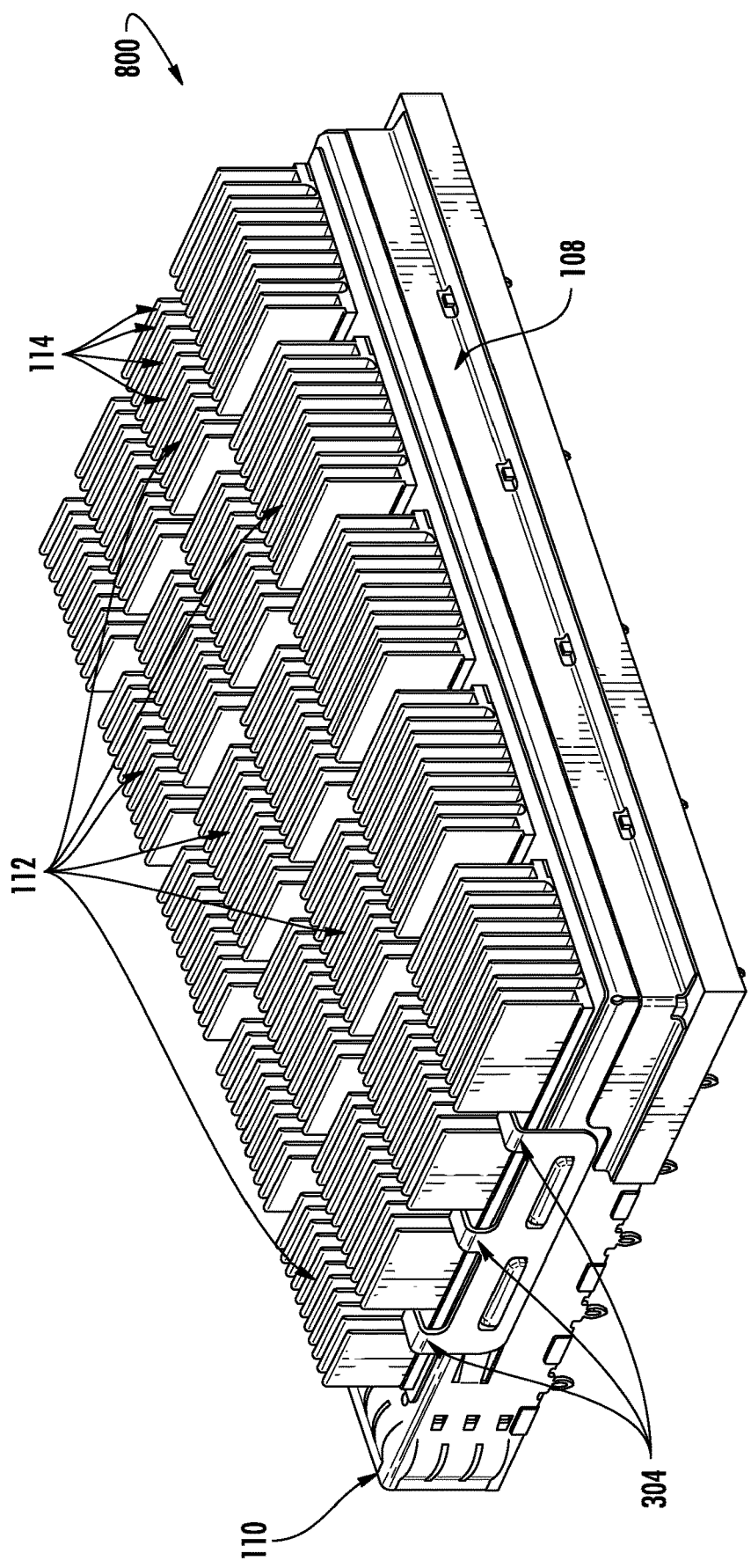
FIG. 8 is a perspective view of a plurality of optical connector cages according to an example embodiment.

With reference to FIGS. 1A-4, the optical connector cage 100 may further facilitate the dissipation of heat by one or more heat dissipation units 112. The one or more heat dissipation units 112 may be disposed on or defined by the top portion 104 of the optical connector cage body. The one or more heat dissipation units 112 may be configured to facilitate the transfer of heat from the optical connector cage 100 to an external environment of the optical connector cage 100. As can be seen in FIG. 3, the one or more heat dissipation units 112 may, for example, define heat dissipation elements 114 (e.g., fins) which extend substantially perpendicularly with respect to the top portion 104 and may extend along a length l of the top portion 104 (e.g., between the first and second ends 110,108). In some embodiments, as shown in FIGS. 1-3, the one or more heat dissipation units 112 may be a single, integral heat dissipation unit extending along a portion of the top portion 104 of the body. However, as shown in FIGS. 4 and 8, in some embodiments, the one or more heat dissipation units 112 may include separate heat dissipation units each defining a plurality of heat dissipation elements 114 (e.g., fins).

As described above, the one or more heat dissipation units 112 may comprise a plurality of heat dissipation elements 114 (e.g., fins) which extend continuously along the length l of the top portion 104 or may extend intermittently along portions of the length l of the top portion 104. Although depicted in FIGS. 1-4 and 8 as a plurality of fins extending along the length l of the optical connector cage between the first end 110 and the second end 108 and further protruding substantially perpendicularly to the top portion 104, the present disclosure contemplates that the one or more heat dissipation units 112 may be oriented in any direction and may be disposed on a portion of the top portion 104 of the body of the optical connector cage 100 (rather than its entirety). Further, the present disclosure contemplates that the one or more heat dissipation elements 114 may extend at any angle with respect to the respective optical connector cage surface (e.g., perpendicularly with respect to the top portion 104 from which it extends or at other angles).

The one or more heat dissipation units 112 (e.g., the pluralities of fins) may facilitate the transfer of heat from the optical cable connector 102 to an external environment of the optical connector cage 100 by increasing the convective cooling experienced by the optical connector cage 100. As would be understood by one of ordinary skill in the art in light of the present disclosure, the one or more heat dissipation units 112 may increase the rate of heat transfer to an external environmental by increasing the surface area of the portion of the optical connector cage 100 contacting the external environment. In other words, by utilizing one or more heat dissipation units 112 (e.g., a plurality of fins), the optical connector cage 100 and (by association and contact with the optical connector cage 100) the optical cable connector 102 can increase its surface area for heat dissipation such that more area is in contact with the air of its external environment (e.g., the air from the environment that is contained and/or flowing through the one or more heat dissipation elements 114). As such, air traveling along the fins is able to receive more heat transferred from the body of the optical connector cage 100 than it would have otherwise if contacting a single, flat surface. As a result, the temperature of the one or more heat dissipation units 112 (e.g., at the ends of the pluralities of fins) remains lower than the temperature of the rest of the body of the optical connector cage 100 (e.g., the top portion 104 and/or bottom portion 106) and results in a larger temperature gradient between these surfaces, thereby serving as a heat sink. The resultant temperature gradient also facilitates transfer of heat from the optical connector cage 100 to the external environment.

As would be understood by one of ordinary skill in the art in light of the present disclosure, the one or more heat dissipation units 112 (e.g., the pluralities of fins) may improve heat dissipation from the optical connector cage 100 (e.g., received by contact between the optical connector cage 100 and the optical cable connector 102) by increasing the contact area between the optical connector cage 100 and the optical cable connector 102. By way of example, the optical cable connector 102 may be configured, in some embodiments, such that the one or more heat dissipation units 112 contact a top surface of an optical cable connector 102 when the connector is received by the optical connector cage 100 (e.g., disposed within the optical connector cage 100). In such an embodiment, a portion of the one or more heat dissipation units 112 (e.g., plurality of fins) may extend partially into the cage and contact a top surface of the optical cable connector 102.

By increasing the contact area between elements (e.g., between a portion of a top surface of the optical cable connector 102 and an inner top portion of the optical connector cage 100) heat may more freely transfer between the connector and the cage. Particularly, the density of atoms found in solid materials is considerably larger than the density of atoms found is gases. This larger atomic density encourages heat transfer due to increased contact at an atomic level. Therefore, increasing the contact area between solid elements as opposed to gases disposed between the optical connector cage 100 and the optical cable connector 102 may improve the heat transfer to an external environment.

As shown in FIGS. 2-4, the optical connector cage 100 may further include a heat dissipation base 200 integral to the one or more heat dissipation units 112 to increase the aforementioned contact area. The heat dissipation base 200 may increase the thermal efficiency of the optical connector cage 100 by providing a planar contact region between the optical connector cage 100 and the optical cable connector 102, as opposed to a plurality of contact points present with fins alone. To further encourage and or urge contact between the optical connector cage 100 and the optical cable connector 102, the optical connector cage 100 may further define a plurality of spring-assisted contact flanges 304 configured to urge the one or more heat dissipation units 112 into contact with a top surface of the optical cable connector 102. As shown in FIGS. 3 and 8, the spring-assisted contact flanges 304 may provide a substantially perpendicular force, with respect to the top portion 104, such that contact between the top surface of the optical cable connector 102 and the heat dissipation base 200 may be promoted.

As described above, increasing the surface area in contact with an external environmental by increasing the surface area of the portion of the optical connector cage 100 contacting the external environment (e.g., the one or more heat dissipation units 112) may increase the heat transfer rates and associated thermal efficiency of the optical connector cage 100. With reference to FIG. 4, a side cross-sectional view of the optical connector cage 100 is illustrated highlighting a first set of the heat dissipation elements 404 and a second set of the heat dissipation elements 402. As shown, in some embodiments, the height of the first set 404 (e.g., a first height) and the height of the second set 402 (e.g., a second height) may be different. In the illustrated embodiments, the heat dissipation units 112 are configured such that some of the elements (e.g., the second set 404) have a greater height than others of the heat dissipation elements. For example, in some embodiments, the second set 402 may extend into the receiving space 600. As shown in FIGS. 3-4, a plane 306 may be defined by a bottom surface of the first set of heat dissipation elements 404. In such an embodiment, the second height (e.g., the height of the second set of heat dissipation elements) may be greater than the first height (e.g., the height of the first set of heat dissipation elements) such that a portion of the second set extends through the plane 306 defined by a bottom surface of the first set of heat dissipation elements, partially entering the receiving space 600 defined by the body of the optical connector cage.

Due to the increased length of the second set of heat dissipation elements 402, which are accommodated by allowing them to extend through the plane 306, the resulting surface area in contact with the external environment is increased and, consequently, the convective cooling experienced by the cage is also increased. As shown in FIGS. 3-4, however, the total height of the optical connector cage 100 is not increased. Particularly, the optical connector cage of the present invention maintains an industry accepted footprint (e.g., meeting industry standards with respect to dimension specifications) while increasing the thermal efficiency via increased surface area of the one or more heat dissipation units 112 in the manner described herein. Although described herein with reference to the second set 402 having a greater height than the first set 404, the present disclosure contemplates that the first set 404 may, in some embodiments, have the greater height. Notably, the difference in height between the heat dissipation elements 114 (e.g. fins) of the first set 404 and the heat dissipation elements 114 (e.g. fins) of the second set 402 may be significant. For example, this height difference may be such that the height of one set of fins is double the height of another set of fins. For example, the first set 404 of heat dissipation elements 114 may have a height of 1.7 mm, while the second set 402 of heat dissipation elements 114 may have a height of 3.5 mm. In some embodiments, each heat dissipation unit 112 may include more than two sets of heat dissipation elements 114, such that each heat dissipation element 114 in a set has a uniform height (e.g., the same height as the other heat dissipation elements 114 of that set), and other sets may have different heights of the heat dissipation elements 114. A set (e.g., first set 404 or second set 402) may include any number of heat dissipation elements 114.

Figure 5:
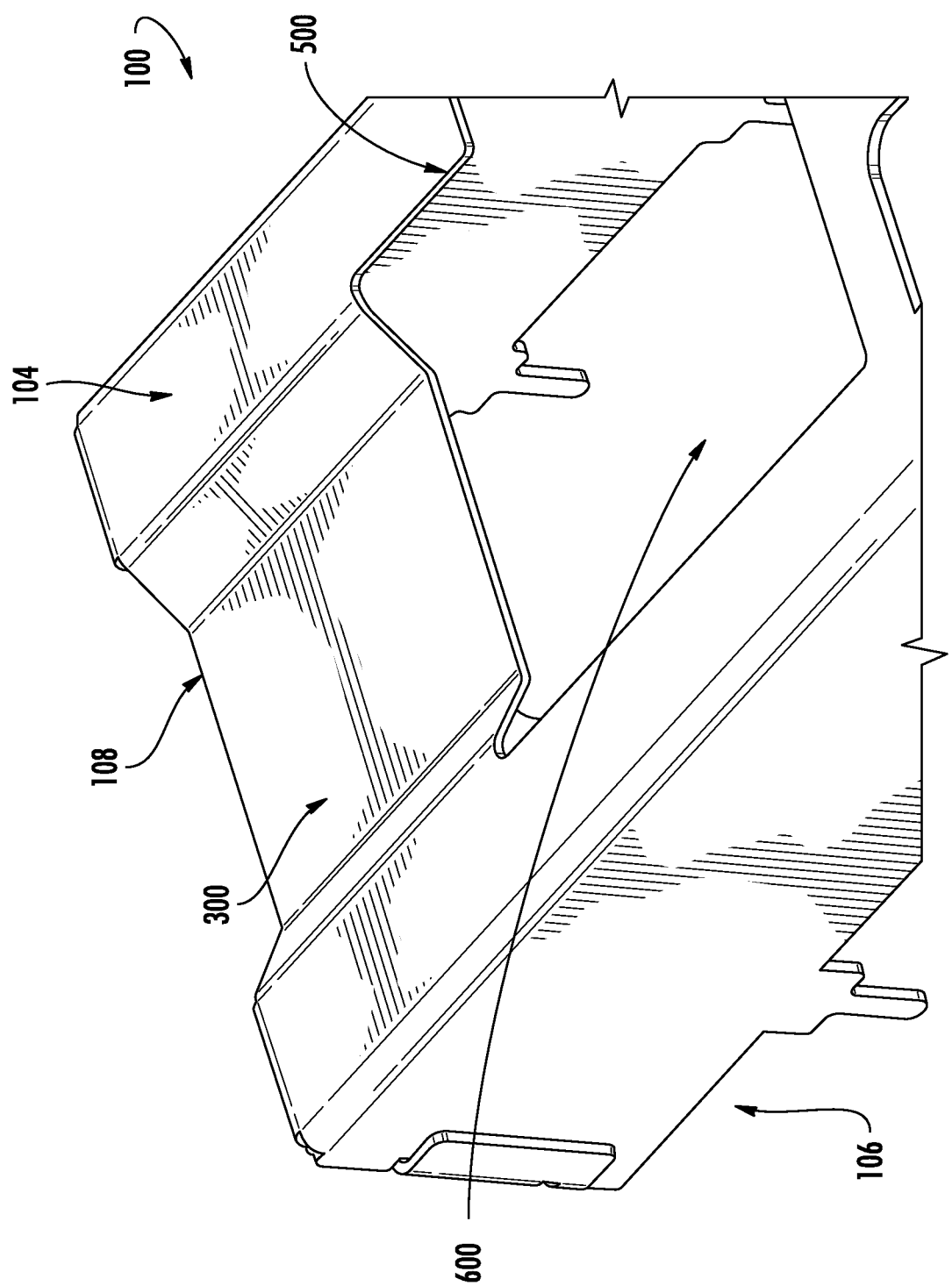
FIG. 5 is a top perspective view of a second end of an optical connector cage without heat dissipation units according to an example embodiment.

With reference to FIGS. 3-5 and 7, the optical connector cage 100 may, in some embodiments, also define a stopper 300. As seen in the referenced figures, increasing the height of one of the first set 404 or the second set 402 of the heat dissipation unit 112 may require modification of traditional connector cage systems to accommodate this increase. In FIG. 5, the stopper 300 is illustrated as a recessed area of the top portion 104 of the body of the optical connector cage, such that the second set 402 is allowed to extend at least partially into the optical connector cage, as described above. This extension into the receiving space (e.g., the receiving space 600 in FIG. 6) of the second set 402 is accommodated by a stopper 300 that is configured (e.g., sized and shaped) to allow for the greater height associated with the second set 402. As an additional consideration, various industry specifications and standards prohibit dimensioning optical connectors (and associated optical connector cages) outside of specified values. The optical connector cage 100 of the present disclosure, however, via a stopper 300 configured as described herein, may therefore also comply with applicable industry standards.

Figure 6:
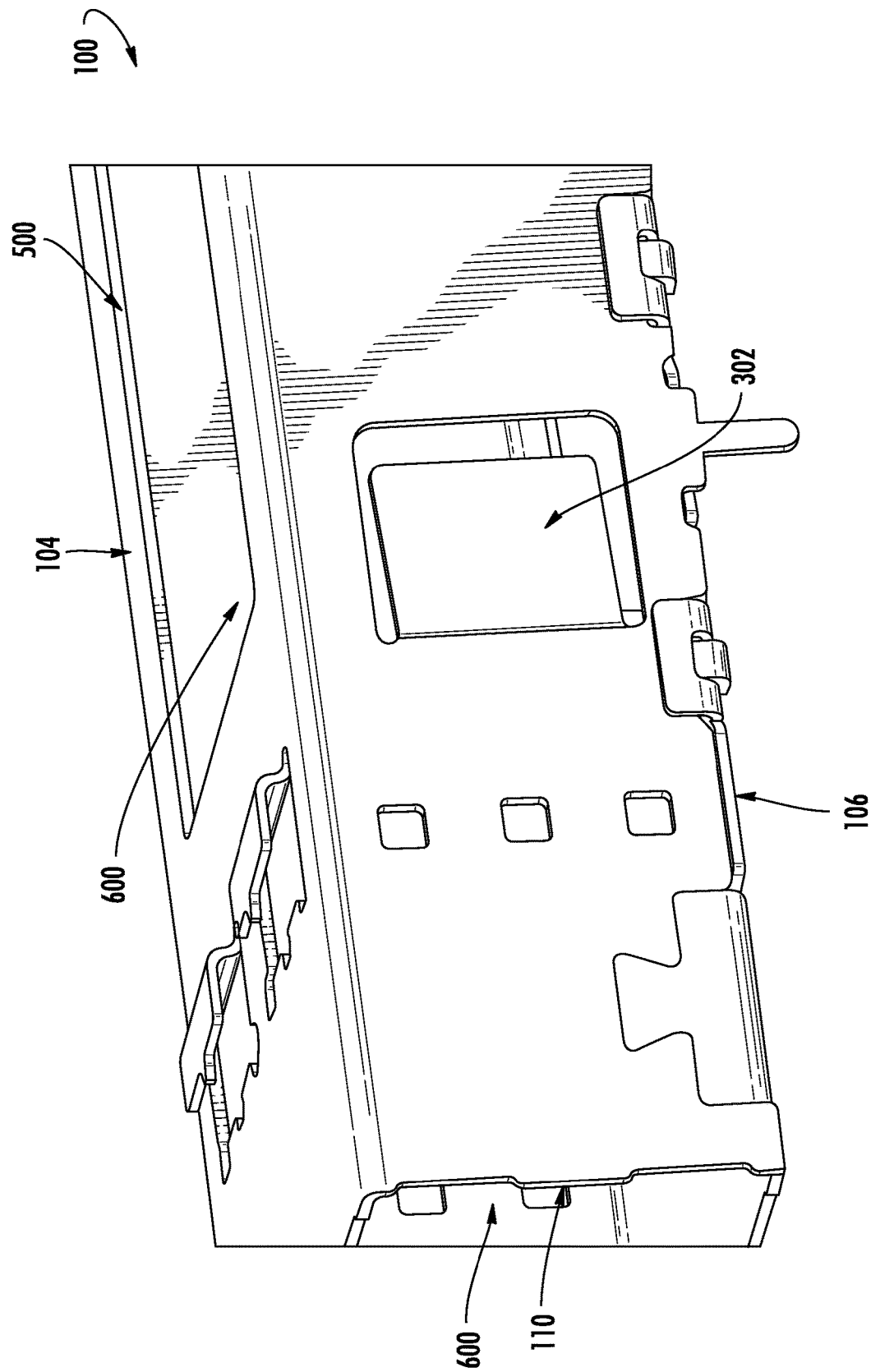
FIG. 6 is a side perspective view of the first end of an optical connector cage without the heat dissipation units of FIG. 5 according to an example embodiment.
Figure 7:
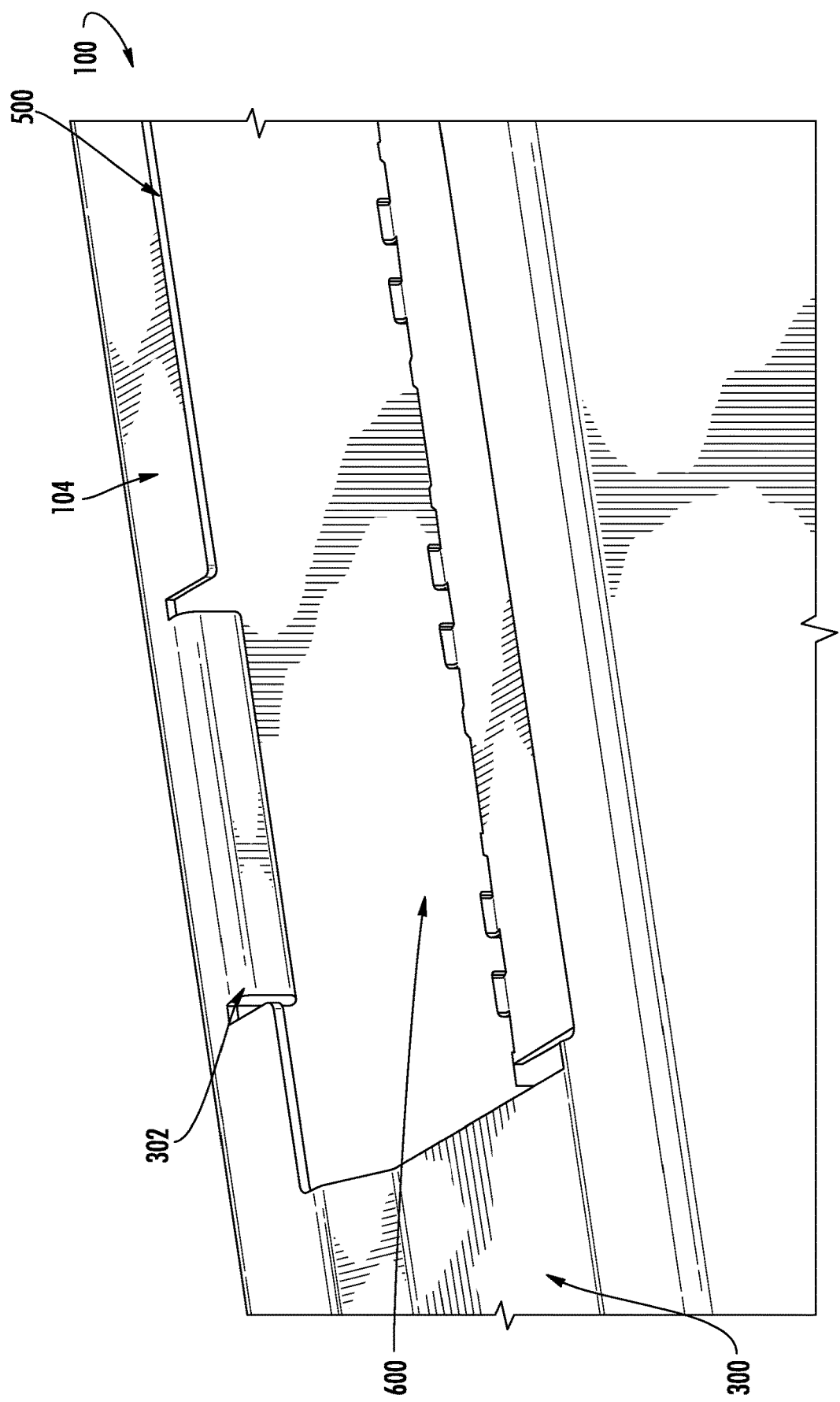
FIG. 7 is a top perspective view of the optical connector cage without the heat dissipation units of FIG. 5 according to an example embodiment.

With reference to FIGS. 5-7, an optical connector cage 100 is illustrated without one or more heat dissipation units 112 for purposes of explanation. As shown, the optical connector cage 100 may define one or more openings 500 such that the one or more heat dissipation units 112 may be disposed in the one or more openings 500 and contact the optical cable connector 102 when in an operational state (e.g., when the optical connector cage 100 receives an optical cable connector 102). In some embodiments, the optical connector cage 100 may also define various attachment features 302. In order to receive the optical cable connector 102 and secure the optical cable connector 102 within the receiving space 600, various mechanical attachments features 302 (e.g., tabs, lips, male to female connections, bayonet connections, snaps, fasteners, or the like) may be defined by the optical connector cage 100 and may be configured to engage a corresponding attachment feature defined by the optical cable connector to secure the optical cable connector in the desired location and orientation within the receiving space 600 of the optical connector cage 100.

With reference to FIG. 8, a plurality of optical connector cages are illustrated. Although generally described herein with reference to a single optical connector cage 100 configured to receive a corresponding optical cable connector 102, the present disclosure contemplates that any number of optical connector cages 100 may be used in datacenters, network connections, or the like.

The present disclosure contemplates that the present invention may be created from any suitable material know in the art (e.g., carbon steel, aluminum, polymers, ceramics, and the like), particularly materials possessing high thermal conductivity. By way of example, the optical connector cage 100 may be created by an extrusion and/or machine process. In such an example, a single body of fixed cross-sectional area may be produced by an extrusion process. This single body may be created via pushing a base material (e.g., a polymer) through a dimensioned die such that the body of the optical connector cage is created. This extruded body may then be modified through a machine process whereby material is removed from the extruded body to create the finished optical connector cable 100. The machining process may include any or all of micro machining, turning, milling, drilling, grinding, water jet cutting, EDM, EDM, AFM, USM, CNC, and the like, in any order or combination. Although described as an extrusion and machine process of a single piece of material, any portion or sub-portion of the optical connector cage 100 may be separately formed or attached without departing from the scope of this disclosure.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components (e.g., components of printed circuit boards, transceivers, cables, etc.) may be used in conjunction with the optical connector cage. Therefore, it is to be understood that the inventions are not to be limited to the specific embodiments disclosed and that modifications and other embodiments are intended to be included within the scope of the appended claims.

What is claimed is:

1. An optical connector cage configured to receive an optical cable connector, the optical connector cage comprising:
   a body defined by a top portion, a bottom portion, two side portions, a first end, and a second end, wherein the body defines a receiving space configured to at least partially receive an optical cable connector therein via the first end, wherein the second end is configured to be received by a datacenter rack for enabling signals to pass between the optical cable connector and the datacenter rack, and wherein the top portion defines one or more openings; and
   a heat dissipation unit disposed within the one or more openings, wherein the heat dissipation unit further comprises a first set of heat dissipation elements extending continuously along a length of the top portion having a first height, and a second set of heat dissipation elements extending continuously along the length of the top portion having a second height, wherein the second height is greater than the first height such that a portion of the second set extends into the receiving space and such that ends of the first set of heat dissipation elements distal from the body and ends of the second set of heat dissipation elements distal from the body are substantially level with each other,
   wherein the heat dissipation elements are configured to allow heat to be transferred from the body to an external environment of the optical connector cage.

2. The optical connector cage according to claim 1, wherein the heat dissipation elements comprise fins.

3. The optical connector cage according to claim 2, wherein the fins are disposed substantially perpendicular with respect to the top portion.

4. The optical connector cage according to claim 1, wherein the one or more openings are spaced along a length of the top portion.

5. The optical connector cage according to claim 1, wherein in an operational configuration in which the optical cable connector is received within the optical connector cage, the optical connector cage is further configured such that the heat dissipation elements contact the optical cable connector.

6. The optical connector cage according to claim 1, wherein the heat dissipation unit further comprises a heat dissipation base integral to the heat dissipation unit and configured to contact the optical cable connector.

7. The optical connector cage according to claim 1, further comprising spring-assisted contact flanges, configured to urge the heat dissipation unit into contact with a top surface of the optical cable connector.

8. The optical connector cage according to claim 1, wherein the top portion of the body further comprises a stopper configured to accommodate an extended length of the second set of heat dissipation elements.

9. A method of manufacturing an optical connector cage configured to receive an optical cable connector, the method comprising:
   forming a body defined by a top portion, a bottom portion, two side portions, a first end, and a second end, wherein forming the body comprises defining a receiving space configured to at least partially receive an optical cable connector therein via the first end, wherein the second end is configured to be received by a datacenter rack for enabling signals to pass between the optical cable connector and the datacenter rack, and wherein the top portion defines one or more openings; and
   forming one or more heat dissipation units disposed within the one or more openings, wherein forming each heat dissipation unit further comprises forming a first set of heat dissipation elements having a first height, and a second set of heat dissipation elements having a second height,
   wherein the second height is greater than the first height such that a portion of the second set extends into the receiving space and such that ends of the first set of heat dissipation elements distal from the body and ends of the second set of heat dissipation elements distal from the body are substantially level with each other, wherein the heat dissipation elements are configured to allow heat to be transferred from the body to an external environment of the optical connector cage.

10. The method according to claim 9, further comprising defining the heat dissipation elements as fins.

11. The method according to claim 10, further comprising forming the fins such that the fins are substantially perpendicular with respect to the top portion.

12. The method according to claim 9, wherein the one or more openings are spaced along a length of the top portion.

13. The method according to claim 9, wherein in an operational configuration in which the optical cable connector is received within the optical connector cage, the optical connector cage is further configured such that the heat dissipation elements contact the optical cable connector.

14. The method according to claim 9, wherein forming the one or more heat dissipation units further comprises forming a heat dissipation base integral to the one or more heat dissipation units and configured to contact the optical cable connector.

15. The method according to claim 9, further comprising providing spring-assisted contact flanges, wherein the spring-assisted contact flanges are configured to urge the one or more heat dissipation units into contact with a top surface of the optical cable connector.

16. The method according to claim 9, further comprising providing a stopper attached to the top portion of the body, wherein the stopper is configured to accommodate an extended length of the second set of heat dissipation elements.

17. The method according to claim 9, wherein the optical cable connector is a quad small form-factor pluggable cable connector.

18. An optical connector cage configured to receive an optical cable connector, the optical connector cage comprising:
a body defined by a top portion, a bottom portion, two side portions, a first end, and a second end, wherein the body defines a receiving space configured to at least partially receive an optical cable connector therein via the first end, wherein the second end is configured to be received by a datacenter rack for enabling signals to pass between the optical cable connector and the datacenter rack, and wherein the top portion defines one or more openings; and
a plurality of heat dissipation units each disposed within a respective one of the one or more openings, wherein each heat dissipation unit further comprises a first set of heat dissipation elements having a first height, and a second set of heat dissipation elements having a second height,
wherein the second height is greater than the first height such that a portion of the second set extends into the receiving space and such that ends of the first set of heat dissipation elements distal from the body and ends of the second set of heat dissipation elements distal from the body are substantially level with each other,
wherein the heat dissipation elements are configured to allow heat to be transferred from the body to an external environment of the optical connector cage.

* * * * *